United States Patent [19]

Coueille

[11] 3,971,673
[45] July 27, 1976

[54] ELECTROCHEMICAL CELL WITH FLUID-TIGHT CASING AND METHOD OF CONSTRUCTION

[75] Inventor: Daniel Coueille, Poitiers, France

[73] Assignee: Saft-Societe des Accumulateurs Fixes et de Traction, Romainville, France

[22] Filed: June 16, 1975

[21] Appl. No.: 586,907

[30] Foreign Application Priority Data
June 28, 1974 France .............................. 74.22739

[52] U.S. Cl. .............................................. 136/133
[51] Int. Cl.² ............................................. H01M 2/04
[58] Field of Search ............... 136/133, 6 F, 6 FS, 136/83, 23, 66, 175; 317/230; 174/52 S

[56] References Cited
UNITED STATES PATENTS

| 3,292,054 | 12/1966 | Burnham et al. .................... 317/230 |
| 3,674,560 | 7/1972 | Alder .................................... 136/23 |

OTHER PUBLICATIONS

Coursey, Hermetic Sealing of Capacitors, Proc. Inst. Electrical Engineers, vol. 97, Part 3, Jan. 1950, pp. 56 and 61.

*Primary Examiner*—Donald L. Walton
*Attorney, Agent, or Firm*—Kenyon & Kenyon Reilly Carr & Chapin

[57] ABSTRACT

The invention concerns an electric cell having a fluid-tight box comprising a metallic tank having a bottom and a lateral wall and at least one current output insulated from the tank. That cell is characterized more particularly in that the housing comprises, moreover, a metallic sleeve surrounding the lateral wall of the tank, stopped up in a fluid-tight manner at its first end by the tank and at its second end by a glass seal through which the current output crosses in a fluid-tight manner. The glass seal and metallic sleeve have substantially equal coefficients of expansion. The invention applies to electrochemical cells having small dimensions and more particularly to lithium cells.

12 Claims, 8 Drawing Figures

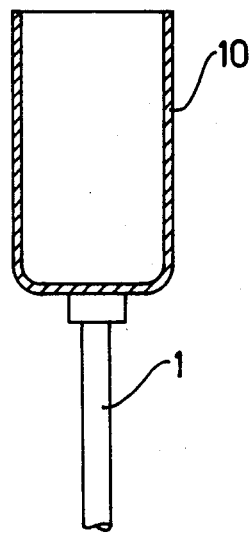
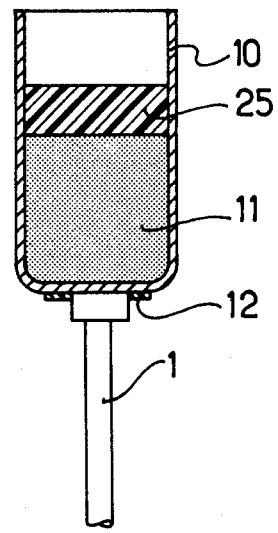
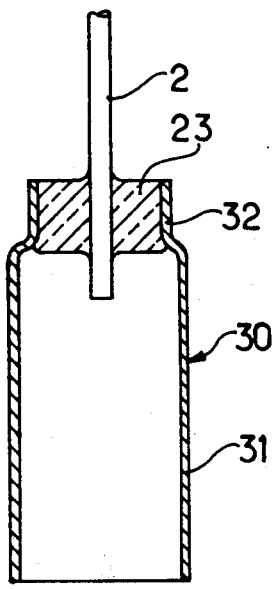
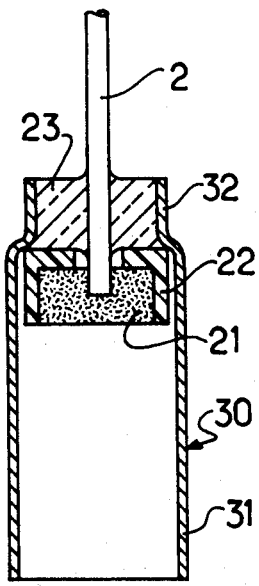
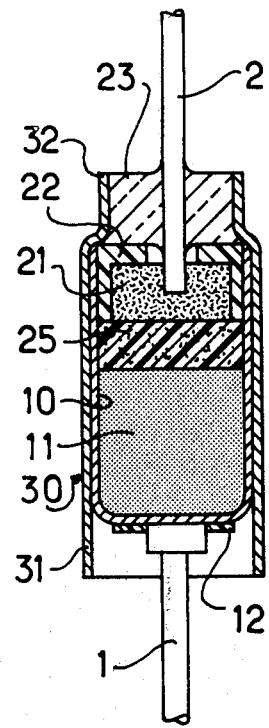

ELECTROCHEMICAL CELL WITH FLUID-TIGHT CASING AND METHOD OF CONSTRUCTION

The invention concerns an electrochemical cell having a fluid-tight casing comprising a metal can having a bottom and a lateral wall. That cell is provided with at least one current output terminal electrically insulated from the said can.

In order to obtain simultaneously fluid-tight sealing and electric insulation, it is usual to insert between the terminal and the walls of the metal can, a seal made of a plastic material. Such a solution has disadvantages more particularly in electric cells having small dimensions (for example in the order of a few millimeters) for which the seal in necessarily very thin. Indeed the result of its thinness is that its insulation is not sufficient and that it allows the passing of a leakage current between the can and the terminal.

If it is considered for example that such an electric cell is intended to be stored for a long time or to discharge very low currents during a long period, the leakage current defined hereinabove assumes a value which is not negligible in relation to the useful current, this causing an appreciable reduction in the duration of the service life of the cell.

The aim of the invention is to overcome that disadvantage.

The present invention has as its object an electric cell having a fluid-tight casing comprising a metal can having a bottom and a lateral wall and at least one current output terminal insulated from that can; it is characterized more particularly, in that its casing comprises, moreover, a metal sleeve surrounding the lateral wall of the can, stopped up in a fluid-tight manner at its first end by the can and at its second end by an undeformable electrically insulating seal through which the said terminal crosses in a fluid-tight manner.

According to a preferred embodiment, the seal is made of glass. It results from the undeformability of that seal the greatest thickness compatible with the dimensions of the cell can be imparted to it.

According to a first embodiment, the stopping up of the first end of the sleeve by the can is made fluid-tight by the turning down of the said first end over the bottom of the can, a seal ring being interposed.

In that case, a shoulder on which the edgeof the can bears is provided on the sleeve or, as a variant, the second end of the sleeve is folded so as to be able to grip the edge of the tank.

According to a second embodiment, the stopping up of the first end of the sleeve by the can is obtained by soldering the said first end to the walls of the can.

An electric cell according to the invention can comprise a first electrode in contact with the said can, a second electrode in contact with the said terminal and an ionically conductive medium between the said electrodes.

In an electric cell according to the invention, the electrical insulation between the terminals of the cell is obtained by the undeformable seal, whereas the seal ring at the first end of the sleeve no longer has to ensure the electric insulating.

Other particularities and advantages of the invention will become apparent from the following description which will be given with reference to the accompanying drawing shown by way of illustration but having no limiting character and in which:

FIGS. 4a, 4b, 4c, 4d, 4e, illustrate respectively the phases of an assembly of a cell according to FIG. 1.

In the various figures, identical elements are indicated by identical reference numerals.

Figure 1:
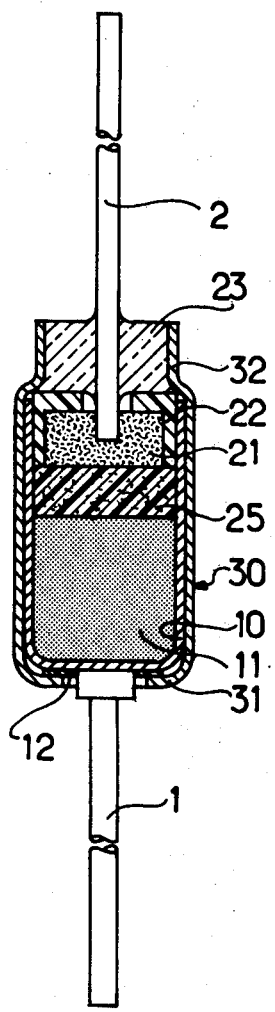
FIGS. 1, 2 and 3 show respectively a cross-section view of three variants of electric cells according to the invention.

The figures show cells having as their positive active material, copper sulphide and as their negative active material, lithium. The cell in FIG. 1 has a metal casing with a diameter of 3 mm, a length of 6 mm and two current output terminals 1 and 2 of opposite polarities constituted by wires situated in the axis of the casing.

The casing comprises a can 10 made of nickel-plated steel or of nickel, in the shape of a cup, welded to the positive output 1 and containing a copper sulfide positive electrode 11 topped by a separator 25 made of a porous plastic material impregnated with electrolyte which can be a solution of lithium perchlorate in propylene carbonate. The separator 25 is itself topped by a negative electrode 21 made of lithium in which one end of the negative terminal 2 penetrates; the anode 21 is surrounded laterally and at its upper part by an insulating cup 22 made of plastic material.

The can 10 is surrounded by a metal sleeve 30 whose end 31 is turned down over a seal 12 made of plastic material applied to the bottom of the can 10 round the positive terminal 1. The end 32 of the sleeve 30 is stopped up by a glass seal 23 in which the negative terminal 2 is embedded. The material of the sleeve 30 is chosen so that its coefficient of expansion be substantially equal to that of glass; it can be a ferro-nickel.

On referring to FIGS. 4a to 4e, it will be seen that the assembly of the cell can be effected from two sub-assemblies:

To form the first sub-assembly, starting with a can 10 connected by welding to the positive output 1 (FIG. 4a), the positive mass 11 is compressed in the can 10 and the separator 25 is arranged upon the latter; the positive terminal 1 is surrounded with the seal 12 which is applied to the bottom of the can 10 (FIG. 4b). The second sub-assembly is formed by the metal sleeve 30 attached to the negative terminal 2 by embedding the latter in the seal 23 (FIG. 4c). The forming of the seal through which the terminal 2 crosses is effected at a high temperature and could not be implemented on a completed cell during assembly, due to the risk of damaging its internal components. The insulation cup made of a plastic material 22 lined with lithium constituting the anode 21 (FIG. 4d) is then inserted in the sleeve 30.

The two preceding sub-assemblies are then fitted into each other (FIG. 4e) in such a way that the upper edge of the can 10 abuts against a shoulder provided in the sleeve 30. The end 31 of the sleeve 30 is then turned down over the seal 12 to close the cell in a fluid-tight manner. It should be observed that sealing is effected between the can 10 which is positively polarized and the sleeve 30 which is insulated from the negative pole by the glass seal 23 which has great insulating power. The seal 12 therefore does not have any insulating function to fulfill.

Figure 2:
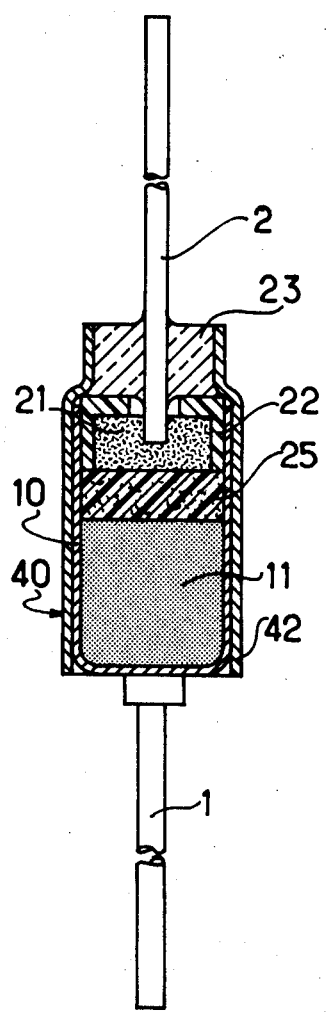

The cell illustrated in FIG. 2 is differentiated from that which has just been described in that the seal ring 12 is replaced by a soldering of the end 42 the sleeve 40 to the cup 10; that soldering can be effected by means of an alloy having a low melting point, for example a tin and indium alloy.

Figure 3:
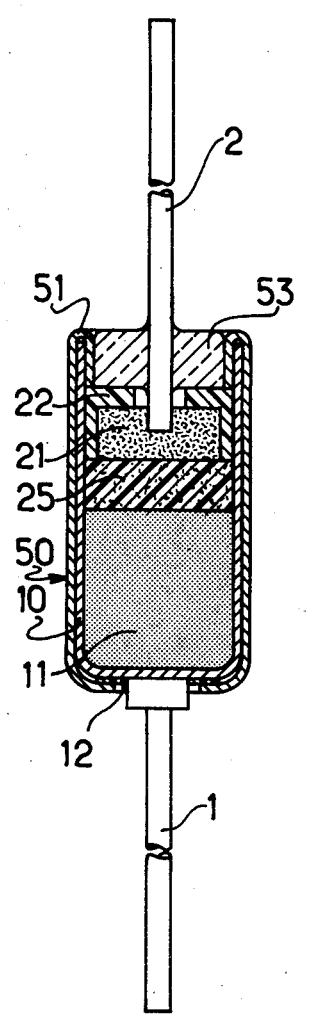

In the cell according to FIG. 3, it is the shape of the end 51 of the sleeve 50 at the level of its contact with the glass seal 53 which is different from that in FIG. 1. As will be seen, that end 51 is folded back so as to provide an annular space. The edge of the can 10 is then inserted in that annular space and the tank 10 bears against the fold at the time of the turning down of the other end of the sleeve 50 over the seal 12.

In all the variants described, the internal disposition of the components has been given only by way of an example. The positions of the electrodes could be reversed, the casing of the cell then being connected to the negative polarity. The electrodes could also be arranged coaxially. The structure of the cell according to the invention can be used for various electrochemical systems and more particularly for those having aqueous electrolytes or those having solid electrolytes, which have practically no self-discharge and do not evolve gas. The nature of the materials of the various elements of the cell can also be changed, but must be compatible with the components of the electrochemical system.

Of course, the invention is not limited exclusively to the electric cells which have just been described.

I claim:

1. Electrochemical cell having a fluid-tight casing comprising a metal can having a closed bottom and a lateral wall and at least one current output terminal insulated from said can characterized in that said casing comprises additionally a metal sleeve surrounding the lateral wall of the said can, said sleeve being sealingly secured in fluid-tight manner at a first end to the can, and an undeformable electrically insulating seal at a second end of said sleeve through which said terminal crosses in a fluid-tight manner, said undeformable seal being of glass and entirely filling and sealing off said second end of said sleeve, and said sleeve being of a material having a coefficient of expansion substantially equal to that of said glass.

2. Electrochemical cell according to claim 1, characterized in that the material of said sleeve is a ferronickel.

3. Electrochemical cell according to claim 1, characterized in that it includes a seal ring at the bottom of said can onto which said first end of said sleeve is bent down tightly to effect said fluid-tight sealing securement of said first end to said bottom of said can.

4. Electrochemical cell according to claim 3 characterized in that the second end of the metal sleeve comprises a shoulder on which the edge the lateral walls of the can bear.

5. Electrochemical cell acording to claim 1, characterized in that the second end of the metal sleeve is folded so as to grip the edge of the lateral walls of the can.

6. Electrochemical cell according to claim 1, characterized in that the said first end of said sleeve is soldered to the walls of the can to effect said sealing fluid-tight securement of said first end of said sleeve.

7. Electrochemical cell according to claim 1, characterized in that it comprises a first electrode in contact with the said can, a second electrode in contact with said terminal and an ionically conductive medium between said electrodes.

8. Electric cell according to claim 7, characterized in that the said first electrode is based on copper sulphide and that the said second electrode is made of lithium.

9. A method of manufacturing an electrochemical cell comprising the steps of providing a metallic can having a closed bottom and an open end, inserting a first electrode into said can and compressing it against the bottom, positioning a separator impregnated with electrolyte over and in contact with said first electrode to provide a first sub-assembly, providing a metal sleeve, applying a glass seal to sealingly close one end of said sleeve with a metal terminal embedded in and crossing said seal, said metal sleeve and glass seal having substantially the same coefficients of expansion, inserting a plastic insulating cup containng a second electrode into said sleeve with said metal terminal penetrating into contact with said second electrode to provide a second sub-assembly, inserting said first sub-assembly into said second sub-assembly so that the second electrode comes into intimate contact with said separator, and sealingly securing the second end of said sleeve to said can.

10. The method according to claim 9 including the step of applying a sealing member to the bottom of said can and turning down said second end of said sleeve over said member to effect said sealing securement of said sleeve to said can.

11. The method according to claim 9 including the step of soldering said second end of said sleeve to said can to effect said sealing securement of said sleeve to said can.

12. The method according to claim 9 including the step of inwardly turning said one end of said sleeve to provide a receiving space for the edge of said open end and of said can, and inserting said edge into said space on insertion of said first sub-assembly into the sleeve of said second sub-assembly.

* * * * *